United States Patent Office 3,456,007
Patented July 15, 1969

3,456,007
CARBOXYMETHYL DERIVATIVES OF TETRACYCLINE ANTIBIOTICS
Jacques Rondelet, Rixensart, Belgium, assignor to Recherche et Industrie Therapeutiques R.I.T., Genval, Belgium, a corporation of Belgium
No Drawing. Filed Dec. 2, 1965, Ser. No. 511,216
Claims priority, application Great Britain, Mar. 9, 1965, 9,942/65
Int. Cl. C07c *103/28, 27/24;* C07d *51/74*
U.S. Cl. 260—559          12 Claims

ABSTRACT OF THE DISCLOSURE

Reaction between a tetracycline, an amine, and glyoxylic acid gives amino carboxymethyltetracyclines having antibiotic activity. Among the amines used are di-alkylamines, morpholine, piperazine, and 4-hydroxyethylpiperazine.

---

The present invention pertains to novel derivatives of tetracycline antibiotics and to the preparation thereof.

The novel compounds of the present invention are represented by the following general Formula I:

Formula I $$R-CO-NH-CH-N\overbrace{\phantom{xxx}}$$
$$\phantom{R-CO-NH-}\overset{|}{C}OOM$$

wherein M is hydrogen or a non-toxic cation, R is a hydronaphthacene radical of a tetracycline antibiotic selected from the class comprising tetracycline itself, 7-chlorotetracycline,
7-bromotetracycline,
5-oxytetracycline,
4-desdimethylaminotetracycline,
4-desdimethylamino-7-chlorotetracycline,
4-desdimethylamino-5-oxytetracycline,
6-deoxytetracycline,
6-deoxy-5-oxytetracycline,
6-demethyltetracycline,
6-demethyl-7-chlorotetracycline,
6-deoxy-6-demethyltetracycline,
6-deoxy-6-demethyl-4-desdimethylaminotetracycline,
metacycline, and
meclocycline, and $$N\overbrace{\phantom{xxx}}$$

is the residue of a primary or secondary amine selected from the class comprising (1) the mono- and di-alkyl-amines, mono- and di-hydroxyalkyl-amines, (2) the secondary saturated heterocyclic amines containing one nitrogen atom and the carboxy, alkyl, hydroxyalkyl, di-alkyl-amino and di-alkyl-aminoalkyl derivatives of said secondary saturated heterocyclic amines, (3) a 4-substituted piperazine wherein the substituent is selected from the class comprising alkyl, hydroxyalkyl, di-alkyl-aminoalkyl and carboxymethyltetracyclines of formula —CH—NH—CO—R
$\overset{|}{C}OOM$ wherein M and R are as above defined, and (4) the ω-amino alkanoic acids and α,ω-di-amino alkanoic acids of from 3 to 6 carbon atoms and their pharmaceutically acceptable salts, the cation of which is M as defined above. The preferred naphthacene radical is that of tetracycline itself, indicated below, the CONH— group as in all of the products of the present invention being attached at the 2-position:

[Structure of tetracycline with positions labeled 1, 2, 3, 4, 4a, 5, 5a, 6, 6a, 7, 8, 9, 10, 10a, 11, 11a, 12, 12a, with substituents CH₃OH at 6, CH₃ at 6, N(CH₃)₂ at 4, OH groups, and carbonyl groups]

each of said alkyl having a maximum of five carbon atoms.

Examples of secondary saturated heterocyclic amine containing one nitrogen atom are piperidine, pyrrolidine, and morpholine.

When the amine fragment is that of an ω-amino alkanoic acid or α,ω-di-amino-alkanoic acid, this one may obviously also be present as a pharmaceutically acceptable salt thereof. Therefore, the cation of this acid fragment is M as defined above.

Examples of non-toxic cations represented by M are the cationic forms of sodium, potassium, calcium, magnesium, aluminium, ammonium and substituted ammoniums.

Although cationic forms of primary and secondary amines including those defined by the residue $$N\overbrace{\phantom{xxx}}$$

in Formula I and other ones such as lidocaine and mepivacaine and the like are also convenient, the cationic forms of tertiary amines—for instance of tri-alkyl-amines having from 1 to 6 carbon atoms—are preferred.

According to this invention, the derivatives of above general Formula I are prepared by reaction between the tetracycline, the amine and glyoxylic acid in substantially stoichiometric amounts in a suitable solvent, the obtained product being optionally transformed into the desired pharmaceutically acceptable salt, the cation of which is M as defined above.

Obviously, when the amine reactant is a diamine with two primary and/or secondary amine functions, both amine functions may react with one glyoxylic acid and one tetracycline molecule according to their respective reactivity. Thus, when piperazine is employed, there is obtained the corresponding di-carboxymethyltetracycline derivative, while when an α,ω-di-amino alkanoic acid (for instance, lysine) is employed, the mono-carboxymethyl tetracycline is obtained through the ω-amino function.

Functional equivalents of the above reactants may obviously be used for the process of the present invention. For instance, functional equivalents of glyoxylic acid (acid form) are the metal salts or salts with a tertiary amine and the hemi acetals formed with lower alkanols containing from 1 to 5 carbon atoms and functional equivalents of tetracycline and of the amine are, for instance, acid addition salts thereof.

The reactants may be used under anhydrous or hydrated form as a little of water does not seen to be deleterious for the reaction.

The reaction is carried out in an inert solvent, i.e. a solvent which, under the conditions of the reaction, does not react in an undesired manner with the starting materials. Preferred solvents are those in which the final products are rather insoluble, for instance, ketones such as acetone or methylethylketone, but other possible inert solvents are, for instance, alkanols as methanol, ethers such as dioxane or tetrahydrofuran and other ones.

Nevertheless, for avoiding undesirable side reactions occurring when solvents such as ketones and ethers are employed, the reactants are then introduced in the sequence tetracycline, amine and glyoxylic acid. Similarly, a soluble alkalinizing agent as an alkali metal derivative or a tertiary amine—as for instance triethylamine—is preferably added to the medium in approximately at least one half equivalent. This addition may be done either at the beginning or in the course or even at the end of the reaction period, preferably at the beginning.

Suitable reaction temperatures are those comprised between about −10° C. and about 60° C., preferably between 0° C. and 30° C. and, even, when a solvent such as methanol is employed, temperatures of about 5° C. are preferred.

When the reaction is performed in a solvent wherein the final product is substantially insoluble—for instance acetone—the reaction product is either recovered by filtration, centrifugation or any other comparable procedure.

When the reaction is performed in a solvent wherein the final product is rather soluble, the reaction product may be precipitated by addition of a second miscible solvent—generally a less polar or nonpolar miscible solvent—in which the product is appreciably less soluble. For instance, ethyl ether is a precipitating agent when methanol is used as reaction solvent. When a solvent such as dioxane is employed, freeze drying is another possible procedure for isolating the product. Those skilled in the art will easily find other possible solvent precipitating systems.

The starting tetracycline antibiotics are known to form complexes with metallic cations such as cationic forms of calcium, magnesium and the like. The same characteristics apply to the novel compounds cited above and the corresponding complexes are obviously also comprised in this invention.

The different derivatives cited above i.e. the salts and complexes are preferably obtained from the corresponding starting materials according to procedures well known to the art. Therefore, it is obvious that formation of the complex precedes that of the salt of the same cation.

The novel compounds of this invention are antibiotic compounds presenting improved therapeutic characteristics by comparison with the parent antibiotics and known derivatives of said parent antibiotics but having the same antibiotic spectrum as said parents. More particularly, the compounds of above general Formula I wherein M is hydrogen or a non-toxic cation selected from the class comprising the cationic form of sodium, potassium and substituted ammoniums defined above and the complexes formed between said compounds of Formula I and metallic cations such as the cationic forms of calcium, magnesium and the like are characterized by higher stability, more particularly at rather neutral pH values comprised between about 5.5 and about 8 and their administration gives appreciable antibiotic activity in the blood serum prolonged over a considerable period after administration. They may be administered by either oral or parental route but, owing to their excellent diffusion into the tissues as shown by their particularly good tolerance at the site of injection, they are particularly suitable for intramuscular administration.

Relatively low amounts of complexing ions (for instance about 0.5 mole of magnesium ion per mole of antibiotic compound) enhance stability of the compound, while higher complexion involves substantial insolubility of the compound at the physiological pH value (7.4±0.1).

For instance, up to 0.5 mole of magnesium ion will be employed for complexing each mole of a compound such as N-[(carboxy)(4-β-hydroxyethylpiperazino)methyl]-tetracycline (triethylamine salt) for intravenous administration, while for intramuscular administration of the same compound higher amounts of magnesium may be employed (preferably about one mole of magnesium ion per mole of said compound).

The novel compounds of this invention may be administered orally using any pharmaceutical form known to the art for such administration or by intramuscular or intravenous route. The preferred compounds are those derived from the heterocyclic amines and from the amino alkanoic acids.

The minimum daily dose is about 100 mg. for the adult human being but higher doses may be administered. Preferred doses are about 100 to 500 mg. a day.

The novel products of this invention present at least one supplemental asymmetric carbon atom when compared with the starting tetracycline antibiotics and can therefore exist in different corresponding optically active epimeric forms, each of them being included in this invention.

The following nonlimitative examples illustrate the invention.

Example 1

Anhydrous tetracycline base (4.525 g., 10 mmoles) is dissolved in 50 ml. of acetone and the solution is cooled up to 0° C. There is then added successively and under stirring a solution of 450 mg. (10 mmoles) of dimethylamine in 25 ml. of acetone at 0° C. and a solution of 952 mg. (10 mmoles) of glyoxylic acid monohydrate in 25 ml. of acetone.

The suspension is allowed to reach room temperature and maintained under stirring for 24 hours.

After that time, the yellowish precipitate is filtered and dried for 48 hours under reduced pressure at room temperature to yield N - [(carboxy)(dimethylamino)-methyl]tetracycline.

The pH value of a 2% aqueous solution of this product is 6.1. When tested for antibiotic potency against *Bacillus cereus* var. *mycoides* ATCC 9634 (diffusion method), the product is shown to present an antibiotic potency equivalent to 92% of the tetracycline present therein.

Example 2

Glyoxylic acid monohydrate (1.71 g., 18 mmoles) is dissolved in ten ml. of methanol and a solution of 3.14 g. (36 mmoles) of morpholine in 14 ml. of methanol is added dropwise under stirring.

The medium is maintained under stirring for fifteen minutes before adding thereto a solution of 8 g. (18 mmoles) of anhydrous tetracycline base in 180 ml. of methanol. The reaction medium is maintained at room temperature and under stirring for a one hour period after complete addition of the tetracycline reactant.

After that reaction time, precipitation of the reaction product is carried out by pouring the solution into two liters of ether/hexane (9/1). The yellowish precipitate is filtered and dried for 48 hours under reduced pressure at room temperature to yield N-[(carboxy)(morpholino)-methyl]tetracycline (morpholine salt).

The pH value of a 2% aqueous solution of this product is 7.15. When tested for antibiotic potency against *Bacillus cereus* var. *mycoides* ATCC 9634, the product is shown to present an antibiotic potency equivalent to 93.5% of the tetracycline present therein.

Example 3

Glyoxylic acid monohydrate (390 mg., 4.1 mmoles) is dissolved in 40 ml. of methanol and a solution of 365 mg. (4.1 mmoles) of morpholine in 10 ml. of methanol is added dropwise under stirring.

The medium is cooled up to 5° C. and maintained under stirring for fifteen minutes before adding thereto 1.780 g. (4 mmoles) of anhydrous tetracycline base. The reaction medium is then maintained at 5° C. and under stirring for a five hour period.

After that reaction time, precipitation of the reaction product is carried out by pouring the solution into 200 ml. of ethyl ether. The yellowish precipitate is filtered and dried for 48 hours under reduced pressure at room temperature to yield N-[(carboxy)(morpholino)methyl]-tetracycline. The pH value of a 2% aqueous solution of this product is 5.9. When tested for antibiotic potency against *Bacillus cereus* var. *mycoides* ATCC 9634 (diffusion method), the product is shown to present an antibiotic potency equivalent to 93.5% of the tetracycline present therein.

Example 4

Glyoxylic acid monohydrate (3.42 g., 36 mmoles) is dissolved in 20 ml. of butanol, and a solution of 1.55 g. (18 mmoles) of piperazine in 7 ml. of butanol is added dropwise under stirring. The medium is cooled up to 0° C. and maintained under stirring for fifteen minutes before adding thereto a solution of 16 g. (36 mmoles) of anhydrous tetracycline base in 360 ml. of butanol. The reaction medium is maintained at 15° C. and under stirring for a six hour period after complete addition of the tetracycline reactant.

After that reaction time, precipitation of the reaction product is carried out by pouring the suspension into four liters of ether/hexane (9/1). The yellowish precipitate is filtered and dried for 48 hours under reduced pressure at room temperature to yield the compound of the following formula:

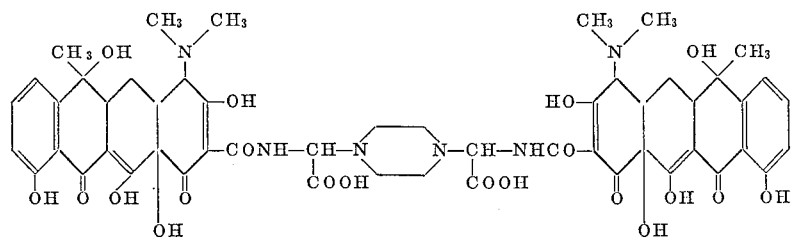

The pH value of a 2% aqueous solution of this product is 4.9. When tested for antibiotic potency against *Bacillus cereus* var. *mycoides* ATCC 9634 (diffusion method), the product is shown to present an antibiotic potency equivalent to 88% of the tetracycline present therein.

Example 5

Glyoxylic acid monohydrate (4.88 g., 51 mmoles) is dissolved in 500 ml. of methanol. Piperidine 4-carboxylic acid (6.78 g., 52 mmoles) is added thereto and the mixture is stirred for fifteen minutes. There is then added under stirring 22.9 g. (51 mmoles) of anhydrous tetracycline base and the medium is maintained for six hours at 0° C. and under stirring. By addition of 1.5 l. of ether there is obtained a yellowish precipitate which is filtered and dried to yield N-[(carboxy)(4-carboxypiperidino)methyl]tetracycline. The pH value of a 2% aqueous solution of this product is 3. When tested for antibiotic potency against *Bacillus cereus* var. *mycoides* ATCC 9634 (diffusion method), the product is shown to present an antibiotic potency equivalent to 92.5% of the tetracycline present therein.

Example 6

Pyrrolidine (1.422 g., 20 mmoles) is dissolved in 250 ml. of methanol and the solution is cooled to 0° C. There is added with stirring a solution of 1.9 g. (20 mmoles) of glyoxylic acid monohydrate in 50 ml. of methanol at the same temperature and the mixture is maintained for 30 minutes at 0° C. and under stirring.

Anhydrous tetracycline base (9.05 g., 20 mmoles) is slowly added with stirring and the medium is allowed to react for 24 hours at 0° C. under continuous stirring.

By addition of 1.5 liter of anhydrous ether, there is obtained a yellowish precipitate which is filtered and dried for 48 hours under reduced pressure at room temperature to yield N-[(carboxy)(pyrrolidino)methyl]-tetracycline.

The pH value of a 2% aqueous solution of this product is 6.36. When tested for antibiotic potency against *Bacillus cereus* var. *mycoides* ATCC 9634 (diffusion method), the product is shown to present an antibiotic potency equivalent to 74.6% of the tetracycline present therein.

Example 7

Anhydrous tetracycline base (9.05 gr., 20 mmoles) is dissolved in 100 ml. of acetone. There is then added under stirring a solution of 2.6 g. (20 mmoles) of N-(2-hydroxyethyl)-piperazine in 20 ml. of acetone. To the suspension there is then added a solution of 1.9 g. (20 mmoles) of glyoxylic acid monohydrate in 20 ml. of acetone and a solution of 3.03 g. (30 mmoles) of triethylamine in 10 ml. of acetone.

The reaction medium is maintained protected from light and under stirring at room temperature and for 20 hours.

After that reaction time, the yellowish precipitate is filtered and dried for 48 hours at room temperature under reduced pressure to yield N-[(carboxy)(4-β-hydroxyethylpiperazino)methyl]-tetracycline (triethylamine salt).

The pH value of a 2% aqueous solution of this product is 7.3. When tested for antibiotic potency against *Bacillus cereus* var. *mycoides* ATCC 9634 (diffusion method), the product is shown to present an antibiotic potency equivalent to 96.5% of the tetracycline present therein.

Example 8

Using the technique described in Example 7 but without addition of triethylamine, there is obtained N-[(carboxy)(4-β-hydroxyethylpiperazino)methyl]-tetracycline.

This product is yellowish coloured and the pH value of a 2% aqueous solution is 5.9. When tested for antibiotic potency against *Bacillus cereus* var. *mycoides* ATCC 9634 (diffusion method), the product is shown to present an antibiotic potency equivalent to 94% of the tetracycline present therein.

Example 9

Glyoxylic acid monohydrate (1.96 g., 20 mmoles) is dissolved in 200 ml. of methanol, and a solution of 2.60 g. (20 mmoles) of N-(2-hydroxyethyl)-piperazine in 50 ml. of methanol is slowly added thereto with stirring.

Stirring is maintained for 15 minutes and the medium is cooled to 5° C. There is then added 10.2 g. (20 mmoles) of tetracycline base trihydrate and the reaction medium is maintained for 20 hours at 5° C. under stirring.

After that reaction time, the solution is concentrated up to 50 ml. and 0.25 liter of acetone is added for precipitating a yellowish product which is filtered and dried to yield N-[(carboxy)(4-β-hydroxyethylpiperazino)methyl]-tetracycline.

When tested for antibiotic potency against *Bacillus cereus* var. *mycoides* ATCC 9634 (diffusion method), the product is shown to present an antibiotic potency equivalent to 97% of the tetracycline present therein.

Example 10

Anhydrous tetracycline base (0.90 g., 2 mmoles) is dissolved in 30 ml. of n-butanol at about 40° C.

There is then added thereto under stirring a solution of 0.26 g. (2 mmoles) of N-(2-hydroxyethyl)-piperazine in 10 ml. of butanol and 0.191 g. (2 mmoles) of glyoxylic acid monohydrate.

A precipitate appears after a few minutes and the suspension is maintained for six hours under stirring and at room temperature.

After that reaction time, precipitation is completed by addition of 120 ml. of ether. The yellowish precipitate is filtered and dried to yield N-[(carboxy)(4-β-hydroxyethylpiperazino)methyl]-tetracycline.

The pH value of a 2% aqueous solution of this product is 6.2. When tested for antibiotic potency against *Bacillus cereus* var. *mycoides* ATCC 9634 (diffusion method), the product is shown to present an antibiotic potency equivalent to 95% of the tetracycline present therein.

Example 11

Dried neutral tetracycline (2.238 g., 5 mmoles) is dissolved in 25 ml. of dioxane. There is then added thereto under stirring 0.651 g. (5 mmoles) of N-(2-hydroxyethyl)-piperazine dissolved in 10 ml. of dioxane, 0.476 g. (5 mmoles) of glyoxylic acid monohydrate dissolved in 5 ml. of dioxane and 0.506 g. (5 mmoles) of triethylamine.

The reaction medium is maintained for 10 hours under stirring at room temperature and the suspension is then lyophilized to yield N-[(carboxy)(4-β-hydroxyethylpiperazino)methyl]-tetracycline (triethylamine salt) with the same characteristics as those of the product obtained in Example 7.

Example 12

Anhydrous tetracycline base (4.52 g., 10 mmoles) is dissolved in 100 ml. of methanol. There is then added successively and under stirring 1.3 g. (10 mmoles) of N-(2-hydroxyethyl)-piperazine dissolved in 50 ml. of methanol, and a suspension of 1.06 g. (10 mmoles) of sodium glyoxylate in 50 ml. of methanol.

Example 14

Anhydrous tetracycline base (4.52 g., 10 mmoles) is dissolved in 160 ml. of methanol and the solution is cooled to 0° C. There is then added thereto a solution of 1.827 g. (10 moles) of l-lysine monohydrochloride and 0.952 g. (10 moles) of glyoxylic acid monohydrate in 5 ml. of water.

The reaction medium is maintained for 6 hours under stirring at 0° C. After that reaction time, the solution is concentrated to 80 ml., under reduced pressure. By addition of 300 ml. of ether, there is obtained a yellowish precipitate which is filtered and dried at room temperature under reduced pressure to yield N-[(5-amino-5-carboxypentylamino)(carboxy) - methyl] - tetracycline monohydrochloride. When tested for antibiotic potency against *Bacillus cereus* var. *mycoides* ATCC 9634 (diffusion method), the product is shown to present an antibiotic potency equivalent to 91% of the tetracycline present therein.

Example 15

Using the technique described in Example 14 but replacing the 1.827 g. (10 mmoles) of l-lysine monohydrochloride by the equivalent amount of respectively: glycine, β-alanine, γ-aminobutyric acid, ornithine, the corresponding N-(carboxymethyl)-tetracycline derivatives are obtained.

Example 16

When the technique of Example 7 is employed, but without the use of triethylamine, and using an equivalent amount of the following amines in place of N-(2-hydroxyethyl)-piperazine, the corresponding products are obtained.

| Amine | Product |
|---|---|
| Ethylamine | N-[(carboxy)(ethylamino)methyl]tetracycline |
| 4-dimethylaminopiperidine | N-[(carboxy)(4-dimethylaminopiperidino)methyl]tetracycline |
| 1-(2-dimethylaminoethyl)piperazine | N-[(carboxy)(4-β-dimethylaminoethylpiperazino)methyl]tetracycline |
| 1-ethylpiperazine | N-[(carboxy)(4-ethylpiperazino)methyl]tetracycline |
| 2-(3-dimethylaminopropyl)piperidine | N-[(carboxy)(2-γ-dimethylaminopropylpiperidino)methyl]tetracycline |
| 3-ethylpiperidine | N-[(carboxy)(3-ethylpiperidino)methyl]tetracycline |
| 2,2'-iminodiethanol | N-[(carboxy)(di-β-hydroxyethylamino)methyl]tetracycline |

The reaction medium is maintained for 24 hours under stirring at room temperature. After that reaction time, the medium is concentrated under reduced pressure up to one third of its initial volume. The obtained suspension is poured into 400 ml. of acetone to achieve precipitation of N-[(carboxy)(4 - β - hydroxyethylpiperazino)methyl]-tetracycline (sodium salt).

The pH value of a 2% aqueous solution of this product is 8.2. When tested for antibiotic potency against *Bacillus cereus* var. *mycoides* ATCC 9634 (diffusion method), the product is shown to present an antibiotic potency equivalent to 93% of the tetracycline present therein.

Example 13

Using the technique described in Example 7 but replacing the 9.05 g. (20 mmoles) of anhydrous tetracycline base by the equipalent amount of respectively 7-chlorotetracycline
7-bromotetracycline
5-oxytetracycline
4-desdimethylaminotetracycline
4-desdimethylamino-7-chlorotetracycline
4-desdimethylamino-5-oxytetracycline
6-deoxytetracycline
6-deoxy-5-oxytetracycline
6-demethyltetracycline
6-demethyl-7-chlorotetracycline
6-deoxy-6-demethyltetracycline
6-deoxy-6-demethyl-4-desdimethylaminotetracycline
metacycline
meclocycline the corresponding N-[(carboxy)(4-β-hydroxyethylpiperazino)methyl] derivatives (triethylamine salt) are obtained.

Example 17

N - [(carboxy)(4 - β - hydroxyethylpiperazino)methyl]-tetracycline (triethylamine salt) (36.7 g.) and 10 g. of magnesium gluconate are dissolved in 400 ml. of pyrogen free bidistilled water. The pH is adjusted to 7.4 with normal sodium hydroxide and the volume is brought to 500 ml. with pyrogen free bidistilled water.

The solution is passed on sterilizing filter and under sterile conditions divided into 15 ml. vials, each of them containing 3 ml. of solution, and then freeze dried.

Solution is reconstituted before intravenous administration by addition and shaking with ten ml. of sterile and pyrogen free water.

Suitable administration dose is about one 220 mg. dosage unit a day.

Example 18

N - [(carboxy)(4 - β - hydroxyethylpiperazino)methyl]-tetracycline (triethylamine salt) (110 g.) prepared as described in Example 7 but in sterile conditions, 60 g. of sterile magnesium gluconate and 12 g. of sterile mepivacaine hydrochloride are under sterile conditions thoroughly mixed and divided into 500 five ml. vials which are then provided with rubber closures.

Solution is reconstituted before intramuscular administration by addition and shaking with about three ml. of sterile and pyrogen free water.

Suitable administration doses for intramuscular route are about one or two 220 mg. dosage units a day.

Example 19

N-[(carboxy)(4 - β - hydroxyethylpiperazino)methyl] tetracycline, triethylamine salt (156 g.) prepared as described in Example 7 is dissolved in 600 ml. of pyrogen free bidistilled water. Magnesium gluconate (80 g.) is added and, during dissolution of this product, the pH value of the medium is adjusted to and maintained at 6.2 with normal sodium hydroxide.

The obtained solution is passed on sterilizing filter and the filtrate is poured under vigorous stirring into six liters of acetone. Stirring is maintained for 30 minutes before filtering the precipitate which is dried at room temperature under reduced pressure and then thoroughly mixed with 17 g. of sterile mepivacaine hydrochloride.

The mixture is divided into 700 five ml. vials which are then provided with rubber closures.

Solution is reconstituted before intramuscular administration by addition and shaking with about three ml. of sterile and pyrogen free water.

Suitable administration doses for intramuscular route about one or two 220 mg. dosage units a day.

Example 20

Magnesium gluconate (520 g.) is dissolved in 3.1 l. of pyrogen free bidistilled water at 50° C. and the solution is cooled to 0° C. while there is prepared a solution of 806 g. of N-[(carboxy)(4-β-hydroxyethylpiperazino)methyl]-tetracycline, triethylamine salt (prepared as described in Example 7) in 4.150 l. of iced pyrogen free bidistilled water and the solution is maintained at 0° C.

The magnesium gluconate solution is slowly added under stirring to the other solution while adjusting the pH of the mixture (with normal sodium hydroxide) to a value comprised between 6.9 and 7.2 up to addition of half the volume of the magnesium gluconate solution. During the addition of the second half of magnesium gluconate solution and up to its complete addition, the pH of the mixture is adjusted to a value comprised between 6.1 and 6.15.

There is then added slowly under stirring 150 g. of magnesium ascorbate, the pH of the solution being maintained at 6.15. The solution is passed on sterilizing filter and the filtrate is poured under vigorous stirring into 80 l. of acetone. Stirring is maintained for 20 minutes after complete addition of the aqueous solution. The precipitate is filtered and dried at room temperature and under reduced pressure during 72 hours. The product is then thoroughly mixed with 125 g. of sterile mepivacaine hydrochloride and the mixture is divided into 3140 five ml. vials which are then provided with rubber closures.

Solution is reconstituted before intramuscular administration by addition and shaking with about three ml. of sterile and pyrogen free water.

Suitable administration doses for intramuscular route are one or two dosage units a day (one dosage unit corresponding to about 150 mg. of tetracycline hydrochloride).

Example 21

| Ingredients: | Mg./tablet |
| --- | --- |
| Product of Example 7 | 388 |
| Lactose | 250 |
| Magnesium stearate | 6.5 |
| Starch | 35 |

The above ingredients are thoroughly mixed and precompressed into tablets. The obtained tablets are then either coated with a 50 microns film of Eudragit L (a product of Rohm und Haas G.m.b.H., Darmstadt, Germany) in order to obtain enteric coated tablets or coated with the following mixture (amounts expressed in percent in the mixture):

| | Percent |
| --- | --- |
| Tolu balsam | 0.24 |
| Shellac | 10.81 |
| Castor oil | 1.24 |
| Gluten | 20.00 |
| Talc | 3.28 |
| Acacia gum | 2.88 |
| Sugar | 61.40 |
| Wax | 0.15 |

Suitable oral administration doses are about one or two of these coated tablets a day.

Example 22

| Ingredients: | Mg./capsule |
| --- | --- |
| Product of Example 7 | 250 |
| Lactose | 140 |
| Light liquid petrolatum | 2 |
| Magnesium stearate | 2 |

The above ingredients are thoroughly mixed and passed through an ASTM No. 25 screen into a No. 1 hard gelatin capsule.

Suitable oral administration doses are about one or two of these capsules a day.

What I claim is:
1. A compound of the formula

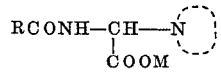

wherein M is hydrogen or a nontoxic cation; R is a 2-naphthacenyl radical of a tetracycline antibiotic selected from the group consisting of tetracycline,
7-chlorotetracycline,
7-bromotetracycline,
5-oxytetracycline,
4-desdimethylaminotetracycline,
4-desdimethylamino-7-chlorotetracycline,
4-desdimethylamino-5-oxytetracycline,
6-deoxytetracycline,
6-deoxy-5-oxytetracycline,
6-demethyltetracycline,
6-demethyl-7-chloro-tetracycline,
6-deoxy-6-demethyltetracycline,
6-deoxy-6-demethyl-4-desdimethylaminotetracycline,
metacycline and meclocycline; and

is mono lower alkylamino; di lower alkylamino; di(ω-hydroxy lower alkyl)amino; ω-carboxyalkylamino or ω-carboxy-ω-aminoalkylamino of from 3 to 6 carbon atoms; morpholino; pyrrolidino; piperdino; carboxy, lower alkyl, di lower alkylamino, or di lower alkylamino lower alkyl piperidino; 4-substituted piperazino wherein the substituent is lower alkyl, ω-hydroxy lower alkyl, di lower alkylamino lower alkyl, or a carboxymethylenetetracycline of the formula

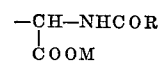

where M and R are as defined above.

2. A compound as claimed in claim 1, in which the nontoxic cation is sodium, potassium, calcium, magnesium, aluminum, ammonium, or trialkylammonium; and R is the 2-naphthacenyl radical of tetracycline, 5-oxytetracycline, or 7-chlorotetracycline.

3. A compound as claimed in claim 3, in which

is 4-(ω-hydroxy lower alkyl)piperazino and the nontoxic cation is triethylammonium.

4. A compound as claimed in claim 3, in which

is pyrrolidino, piperidino, morpholino, 4-(ω-hydroxy lower alkyl)piperazino, ω-carboxyalkylamino of from 3 to 6 carbon atoms, or ω-carboxy-ω-aminoalkylamino of from 3 to 6 carbon atoms.

5. N-[(carboxy)(dimethylamino)methyl]tetracycline.
6. N-[(carboxy)(morpholino)methyl]tetracycline.
7. A compound of the formula 8. N-[(carboxy)(pyrrolidino)methyl]tetracycline.
9. N-[(carboxy)(4 - β - hydroxyethylpiperazino)methyl]tetracycline.
10. N-[(carboxy)(4 - β - hydroxyethylpiperazino)methyl]tetracycline, triethylamine or sodium salt.
11. N-[(5 - amino - 5 - carboxypentylamino)(carboxy)methyl]tetracycline.
12. N-[(carboxy)(4 - carboxypiperidino)methyl]tetracycline.

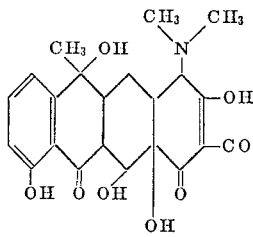 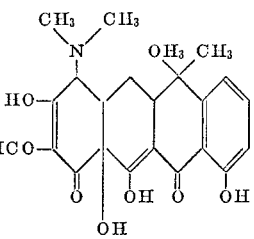

References Cited

UNITED STATES PATENTS 3,275,652    9/1966    Martell.

ALEX MAZEL, Primary Examiner

ANNE MARIE TIGHE, Assistant Examiner

U.S. Cl. X.R.

424—227

PO-1050
(5/69)

UNITED STATES PATENT OFFICE
CERTIFICATE OF CORRECTION

Patent No. 3,456,007    Dated July 21, 1969

Inventor(s) _____

It is certified that error appears in the above-identified patent and that said Letters Patent are hereby corrected as shown below:

Claim 3, the first line should read "A compound as claimed in claim 1, in which" ;

Claim 4, the first line should read "A compound as claimed in claim 1, in which" ;

Claim 7, that portion of the formula reading

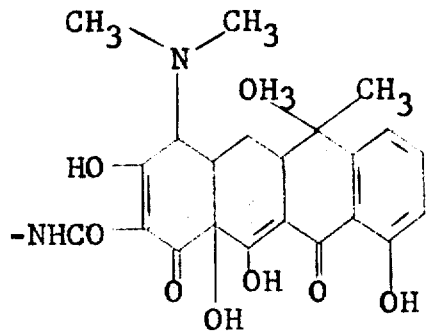    should read    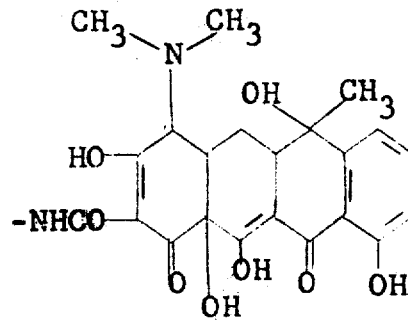

Claim 7, that portion of the formula reading

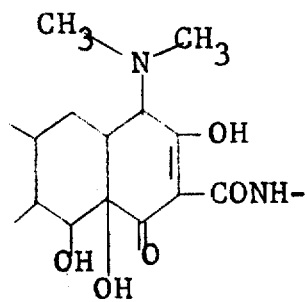    should read    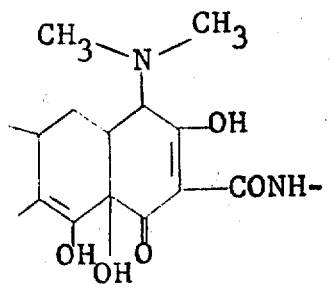

SIGNED AND
SEALED
APR 14 1970

(SEAL)
Attest:

Edward M. Fletcher, Jr.
Attesting Officer

WILLIAM E. SCHUYLER, JR.
Commissioner of Patents